Aug. 18, 1936.    W. H. HENDEL ET AL    2,051,042
TIRE PRESSURE MEASURING DEVICE
Filed Jan. 21, 1931
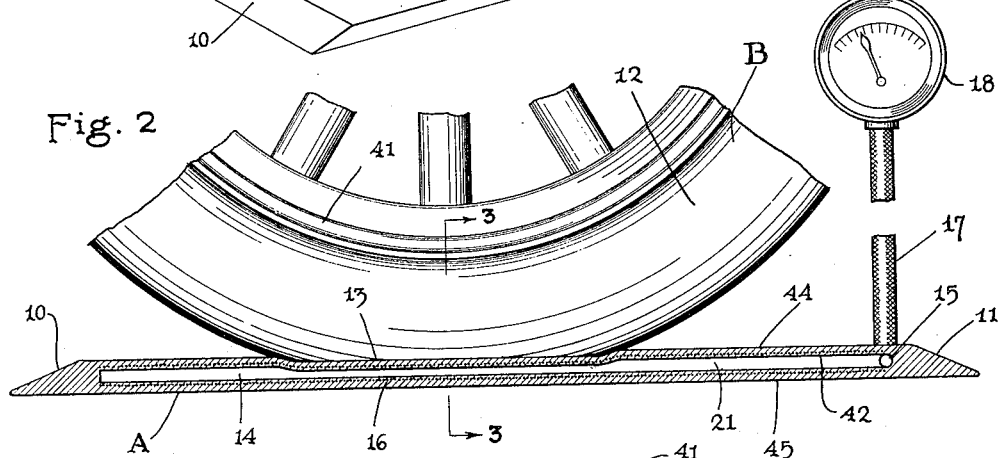
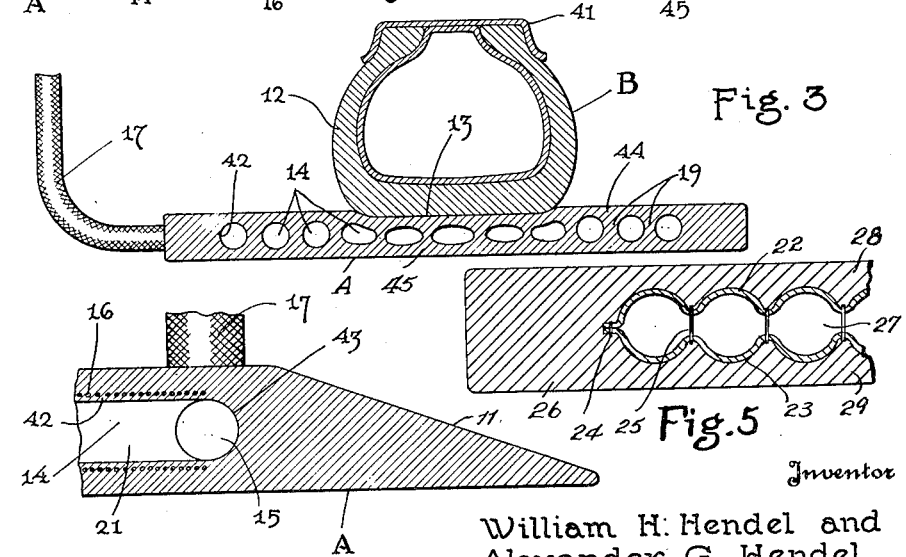
Inventor
William H. Hendel and
Alexander G. Hendel
By Caswell & Jagaard
Attorneys Patented Aug. 18, 1936

2,051,042

UNITED STATES PATENT OFFICE 2,051,042

TIRE PRESSURE MEASURING DEVICE

William H. Hendel and Alexander G. Hendel, Minneapolis, Minn.

Application January 21, 1931, Serial No. 510,184

13 Claims. (Cl. 73—31)

Our invention relates to devices for measuring the pressure of pneumatic tires and has for its object to provide a fluid operated device capable of indicating the pressure in a tire without removal of the valve cap thereof or the release of any of the air from the tire.

An object of the invention resides in providing a fluid operated device, over which the tire on a vehicle may be run and by means of which the pressure in the tire may be indicated through the action of the supporting surface of the tire.

An object of the invention resides in providing a hollow contractible body having a fluid therein, said body being adapted to be contracted by engagement of a tire therewith and in further providing a pressure responsive device connected with said hollow body subject to the pressure of the fluid for indicating the pressure within the tire applied to the body.

A still further object of the invention resides in constructing said body in the form of a mat or tread, over which the vehicle tire may be run.

An object of the invention resides in constructing said mat with two walls, said walls being spaced from one another to provide a chamber therebetween extending over an appreciable portion of the area of said mat.

Another object of the invention resides in constructing said mat of a flexible material, so that the walls thereof may be made to move toward or from one another, depending upon the pressure exerted by the tire resting upon the mat.

A feature of the invention resides in providing restraining members for limiting the movement of the walls of the mat from one another.

An object of the invention resides in disposing the restraining members at frequent intervals throughout the area of the mat.

Another object of the invention resides in using flexible cords as restraining members adapted to readily bend to permit of the movement of the walls of the mat toward one another to collapse the chamber within the mat, said cords resisting elongation to prevent movement of the walls from one another after the walls have reached a predetermined position.

A still further object of the invention resides in utilizing a pressure gauge responsive to the unit pressures within said chamber and in calibrating said gauge to directly indicate the pressures within the tires tested.

Another object of the invention resides in constructing one form of mat with a number of interconnected tubes having circumferential restraining members for limiting the expansion of the tubes and permitting the collapsing of said tubes and in incorporating such tubes and members in a composite structure to form a mat or tread over which a vehicle car may be run.

Another object of the invention resides in constructing another form of mat with two sheets of fabric stitched together in spaced relation at frequent intervals to form a continuous space therebetween and in coating said fabric sheets with impervious layers of material, adapted to form a mat-like structure, having a fluid-tight chamber therein.

Other objects of the invention reside in the novel combination and arrangement of parts and in the details of construction hereinafter illustrated and/or described.

In the drawing:

Fig. 1 is a perspective view of a pressure measuring device illustrating an embodiment of our invention.

Fig. 2 is a longitudinal sectional view of the structure shown in Fig. 1, illustrating a tire resting upon the same.

Fig. 3 is a cross sectional view taken on line 3—3 of Fig. 2 and drawn to a slightly larger scale.

Fig. 4 is a fragmentary longitudinal sectional view of one portion of the mat shown in Figs. 1 to 3, drawn to an enlarged scale.

Fig. 5 is a cross sectional detail view similar to Fig. 4 of a modified form of mat structure.

In the measuring of the pressure of pneumatic tires, considerable difficulty and inconvenience is encountered in the ordinary method in removing the valve caps and applying to the valve stems the ordinary pressure gauge now available for such purpose. Furthermore, measuring of tire pressure by such methods requires more or less time and is a rather dirty task. The instant invention overcomes these disadvantages by providing a device over which the tire of a vehicle may be run, and which will directly and without effort to the observer, indicate the pressure of the tire resting upon the same. The present invention contemplates the use of one or more measuring devices to be utilized on one or more of the tires, so that the pressures of the various tires may be simultaneously indicated. The invention further contemplates the use of the measuring device as a portable structure capable of being brought to the vehicle and placed on any floor or surface and the vehicle run upon the same and also contemplates the permanent mounting of the devices in conjunction with run-ways leading up to the same and with the various pressure gauges all situated in close proximity to one another to permit of readily ascertaining the pressures in the various tires.

For the purpose of illustrating the application of the invention, a portion of a vehicle tire B has been shown, which comprises the usual casing 12, mounted upon a wheel of the vehicle which has been partly shown at 41. The tire illustrated is assumed to be inflated and the contacting surface thereof when supporting the vehicle proper is designated by the numeral 13 in Figs. 2 and 3.

In Figs. 1 to 4 inclusive, we have shown one form of the invention. This device comprises a tread or mat which we have designated in its entirety at A and which is planiform and of a relatively thin thickness. This mat is of an area appreciably greater than the supporting surface 13 of the tire whose pressure is to be measured so that the tire may be readily run upon the tread or mat A and so that the entire supporting surface thereof will rest upon the mat. The mat is preferably constructed beveled at its forward and rearward edges, 10 and 11, to assist in the running of the vehicle tire upon the same.

The mat A as best shown in Figs. 3 and 4 is preferably constructed of rubber or some other suitable resilient material which may be readily contracted when the tire is run over the same. This mat is provided with a number of closely spaced tubes 42 having cylindrical bores or tubular spaces 14 therein. These bores are inter-connected at one end through a manifold 43 having a bore 15. These bores constitute in the aggregate, a confined chamber within the mat A, substantially co-extensive in extent, with the area thereof, which I have indicated in its entirety by the reference character 21. The tubes 42 and the manifold 43 are encased within cylindrical casings 16 which may be formed of woven fabric or cords wound about the same. The mat may be formed by vulcanizing so that the entire structure becomes an integral mass and so that the cords become imbedded in the body of the mat proper to encase the various bores 14. By so constructing the mat, the same is formed with two spaced walls 44 and 45 and with a number of intervening columns 19 connecting said walls and disposed between the various bores 14 all formed of the material of which the mat is constructed, which, when the tire is placed upon the mat, assist in carrying the load thereof. The amount of load taken by these columns depends upon the resiliency of the material from which the mat is made, as well as the compressibility of the fluid used within the same. The cord or other material from which the casings 16 are constructed is preferably of a flexible nature and is practically inextensible. The casings 16 hence permit the mat being readily compressed and the spaces 14 thereof being contracted or collapsed and at the same time prevent the expansion of said spaces and the chamber formed thereby beyond the normal volume of the same.

The manifold 43 of the mat A is connected through a flexible tube 17 with a pressure gauge 18, which is in direct communication with the chamber 21, formed by the bores 14. This tube is preferably encased or armored to protect the same and to prevent expansion thereof beyond a certain limit, as is now well known in the art. The gauge 18 may be of the Bourdon or piston type or any other suitable pressure responsive device may be employed which will indicate the pressure within the chamber 21.

For actuating the gauge 18, the chamber 21 may be filled with any suitable fluid. Liquids such as glycerine, alcohol, water, certain types of oil, castor-oil, various types of mineral and vegetable oils, mercury and mixtures of such liquids may be used. Where a gas is employed, air is preferable, though any other inert gas may be utilized, which will not react with the material with which the mat is formed. Such gas may be under pressure if desired, depending upon the construction of the device and the type of pressure responsive mechanism employed.

For the purpose of filling the device with the fluid, any suitable means and method may be used, such as is now well known in the art. A tube connected to the manifold 43 may be provided, which is sealed after the device is filled. Suitable hose connections may be provided at each end of the hose, which may be disconnected when it is desired to fill the device. After the device has been filled, the connections may again be attached to bring the gauge into communication with the contractible chamber.

The mat A, as constructed, may be compared with a piston cylinder structure of variable cross section, having a relatively small stroke. When the tire is run over the mat, the supporting surface 13 thereof rests directly upon the mat and compresses a corresponding portion of the mat, causing the mat to contract and the chamber 21 to become partially collapsed or reduced in volume. The reduction of the volume depends upon the weight on the vehicle tire and the area of the supporting surface of the tire. The reduction further depends upon the capacity of the intervening column portions 19 of the mat structure between the various bores 14 to share the load created through the weight upon the tire. Where a substantially non-compressible fluid is applied, where the portions 19 offer little or no support to the tire, and where the gauge requires little displacement, the weight on the tire transmitted through the surface 13, serves merely to change the pressure in the fluid without materially changing the volume of the chamber 21. To more readily illustrate the invention, the depression of the mat by engagement with the tire has been greatly exaggerated, though in actual practice, the compression might be entirely invisible to the naked eye and unascertainable except by suitable measuring instruments.

The operation of the invention is as follows:

Assuming a given load upon the particular tire whose pressure is to be measured and a given pressure within the tire, the tire when resting upon the floor or the surface on which the vehicle stands, will flatten out to form the supporting surface 13 previously referred to. The greater the pressure in the tire, the less the area of this supporting surface and vice versa. With a given tire pressure and wheel load, the mat A would be compressed over an area corresponding to the supporting area 13, which would create a certain pressure in the liquid in the chamber 21, causing a certain dial reading on the gauge 18. This would be equivalent to the application of a given load to a cylinder of certain dimensions. Suppose now, that the pressure in the tire B were reduced by letting out some of the air. The tire would then flatten and the supporting surface 13 of the tire increase and the tire would extend over a greater portion of the area of the mat A. This would be equivalent to the application of the same load to a cylinder having a greater cross sectional area. The load however, being the same in both cases, the unit pressure would be considerably less with the partly inflated tire. This would cause a lower reading of the gauge 18. In like manner increasing the pressure in the tire B would reduce the area of the surface 13 and would cause a higher reading on the gauge 18. It can readily be comprehended that with any change of the pressure of the tire, a corresponding change in the reading of the gauge 18 will be had and that the gauge 18 might be calibrated to read directly in terms of the pressure within the tire proper. Inasmuch as a definite relation exists between the area of the supporting surface 13, the load on the tire and the pressure within the tire, the gauge 18 will correctly indicate the pressure within the tire regardless of the load carried by the same and regardless of the size of the tire.

In Fig. 5 another form of mat similar to that shown in Figs. 1, 2, 3 and 4 is illustrated. Instead of constructing the chamber within the mat of a number of tubular bores as in the mat A, a continuous chamber is formed substantially co-extensive with the area of the mat. This chamber is constructed as follows: Two sheets of flexible non-elastic material 22 and 23, such as canvas or the like are employed, which are laid one upon the other in overlying relation. These sheets are tightly stitched together along the edges thereof as indicated at 24 and are loosely stitched at frequent intervals throughout the area of the mat as indicated at 25 to form a plurality of closely spaced ties between the two sheets of fabric. The entire structure is covered with rubber and vulcanized to form a body structure 26 having a continuous chamber 27 therein, disposed between upper and lower walls 28 and 29 of said body structure. It will be readily comprehended that the stitchings 25 prevent the portions 28 and 29 of the mat to separate beyond a predetermined limit and at the same time permit of freely compressing the same to reduce the volume of the chamber 27. The chamber 27 in this form of the invention, similar to that shown in Fig. 1 is connected through a hose with a suitable pressure gauge (not shown). With this type of the invention, a pressure gauge having a small amount of displacement is preferably employed and the fluid is preferably a liquid which is practically incompressible.

When the form of the invention shown in Figs. 1, 2 and 3 is constructed from a material such that the columns 19 are capable of sustaining the major portion of the load on the tire, the device will operate in a slightly different manner than that previously described. In such case, the movement of the gauge will depend upon displacement of the fluid within the chamber 21 rather than upon pressure of the fluid. A gauge having a corresponding displacement will then have to be employed if an incompressible liquid be used. Any type of gauge will be suitable with such construction if a gas be employed.

Although we have shown and described a single mat or tread for use with one of the tires of the vehicle at a time, it can readily be comprehended that four such mats may be employed and permanently or temporarily mounted so that the car may be driven with all the wheels thereon resting upon the mats. It is also to be understood that the gauges from the various mats or treads may be assembled collectively and if desired in a single case, so that the pressure in all of the tires may be quickly ascertained. Although we have shown the structure for forming the contractible chamber as constructed of rubber or some other resilient material, it can readily be comprehended that the same may be constructed in various different forms. Any number of different forms of devices for providing a substantially planiform chamber within the mat or tread proper may also be employed within the scope of our invention.

The invention is highly advantageous in that an extremely simple and effective device is produced whereby the pressures in the tires of vehicles may be quickly and positively determined without removing the caps and applying a pressure gauge to the tire valves. The device may be constructed without jointed metal parts if desired, so as to eliminate the disadvantages following mechanical devices embodying such construction. The device is extremely positive in action and sufficiently accurate for the desired purpose. The gauges can be calibrated to read directly in pounds per square inch of pressure, indicating the exact air pressure within the tire. The device can be constructed from readily available materials and at an extremely economical price, so that the same may be universally sold and adopted. The device may be made so that the same is extremely light and may be readily moved about as the occasion demands. Our invention may be permanently installed in conjunction with a run-way over which the vehicle may be run or the same may be portable and moved about as desired.

Changes in the specific form of our invention as herein disclosed may be made within the scope of what is claimed, without departing from the spirit of our invention.

Having described our invention, what we claim as new and desire to protect by Letters Patent is:

1. A tire pressure measuring device comprising a hollow contractible body of extended area, adapted to be engaged at a portion of the surface thereof by the supporting surface of a tire whose pressure is to be measured and to be contracted thereby, said body having a fluid therein, pressure responsive means communicating with the interior of said hollow body for indicating the pressure within the tire engaging said body and means for restraining said body from expansion beyond normal.

2. A tire pressure measuring device comprising a planiform member having two walls provided with a confined chamber therebetween, said walls being movable toward and from one another independently at different portions thereof, means for limiting the movement of said walls from one another, said member having a fluid within said chamber and pressure responsive means communicating with said fluid chamber for indicating the pressure within the tire.

3. A tire pressure measuring device comprising a planiform member having two walls provided with a confined chamber therebetween, said walls being movable toward and from one another independently at different portions thereof, flexible cords connecting said walls to allow the movement of said walls toward one another, said cords limiting the movement of said walls away from one another, said member having a fluid within said chamber and pressure responsive means communicating with said fluid chamber for indicating the pressure within the tire.

4. A mat comprising upper and lower walls formed of flexible material and separated from one another to provide a confined chamber therebetween extending over a portion of the area thereof and having a fluid therein, said walls being movable toward and from one another to vary the pressure of the fluid within said chamber and members connecting said walls at intervals throughout their extent for limiting the movement of said walls from one another.

5. A tire pressure measuring device comprising a mat over which the pneumatic tire of a vehicle may be run, said mat being formed of rubber and constructed with a plurality of inter-communicating tubular chambers therein, each being encased within a flexible casing permitting of the collapsing of said chambers and restraining the expansion thereof and pressure responsive means communicating with said chambers for indicating the pressure within the tire resting upon the mat.

6. A pneumatic tire pressure measuring device, comprising a mat consisting of two fabric sheets stitched together at frequent intervals throughout the extent thereof to leave a space therebetween coextensive with the surface of said sheets and a rubber coating on said fabric sheets for confining said space and rendering said space fluid-tight to form a chamber within said mat, said chamber having a fluid therein and a pressure gauge connected to said mat and communicating with said fluid chamber.

7. A tire pressure measuring device comprising a hollow contractible body of extended area, adapted to be engaged at a portion of the surface thereof by the supporting surface of a tire whose pressure is to be measured and to be contracted thereby, said body having a fluid therein, pressure responsive means communicating with the interior of said hollow body for indicating the pressure within the tire engaging said body and means for restraining expansion of said body throughout the surface thereof which is not engaged by the tire.

8. A tire pressure measuring device comprising a planiform member constructed with two spaced walls forming a confined chamber therebetween, said chamber having a fluid therein, one of said walls being constructed of a flexible material and movable at various localities thereof independently toward and from the other wall, a plurality of flexible cords connecting said walls together, said cords limiting the movement of the flexible wall from the other wall and pressure responsive means communicating with said fluid chamber.

9. A tire pressure measuring device comprising a planiform member constructed with two spaced walls forming a confined chamber therebetween, said chamber having a fluid therein, one of said walls being constructed of a flexible material and movable at various localities thereof independently toward and from the other wall, tethering means between the two walls and pressure responsive means communicating with said fluid chamber.

10. A tire pressure measuring device comprising a planiform member constructed with a plurality of juxtaposed flexible tubular casings arranged in a plane and providing intercommunicating tubular chambers having a fluid therein, two walls enclosing said casings, one thereof being flexible and each being connected to each of said casings and to one another, said flexible wall being movable toward the other wall and said casings restraining movement of the flexible wall from the other wall, and pressure responsive means communicating with said chambers.

11. A tire pressure measuring device comprising a planiform member constructed with two spaced walls forming a confined chamber therebetween, said chamber having a fluid therein, one of said walls being constructed of a flexible material movable at various localities thereof independently toward and from the other wall, and a plurality of collapsible retaining members connecting said walls together, said members limiting the movement of the flexible wall from the other wall, and pressure responsive means communicating with said chamber.

12. A tire pressure measuring device comprising a planiform member constructed with a number of ties of cord and being formed with intercommunicating tubular chambers having a fluid therein, two walls enclosing said chambers, each connected to said ties at opposite portions thereof and to one another, one of said walls being flexible and movable toward the other wall, said ties restraining movement of the flexible wall from the other wall, and pressure responsive means communicating with said fluid chamber.

13. A tire pressure measuring device comprising a planiform member constructed with two spaced walls forming a confined chamber therebetween having a fluid therein, one of said walls being movable toward and from the other independently at different portions thereof, a plurality of flexible members interconnecting the two spaced walls at spaced intervals permitting movement of one wall toward the other wall, but preventing separation of the walls beyond a predetermined limit, and pressure responsive means connected with said chamber.

WILLIAM H. HENDEL.
ALEXANDER G. HENDEL.